(12) United States Patent
Andrews et al.

(10) Patent No.: US 6,464,402 B1
(45) Date of Patent: *Oct. 15, 2002

(54) OPTICAL FIBER CONNECTOR TUNING INDEX TOOL

(75) Inventors: Scott R. Andrews, Dacula, GA (US); Norman Roger Lampert, Norcross, GA (US); Robert Wayne Mock, Lawrenceville, GA (US); Gregory A. Sandels, Buford, GA (US); Naif Taleb Subh, Lawrenceville, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/363,908

(22) Filed: Jul. 28, 1999

(51) Int. Cl.[7] ................................................. G02B 6/36
(52) U.S. Cl. .......................... 385/53; 385/55; 385/56; 385/70; 385/134
(58) Field of Search ............................. 385/53, 55, 56, 385/70, 75, 139, 147, 140, 134

(56) References Cited

U.S. PATENT DOCUMENTS

| | | | | |
|---|---|---|---|---|
| 4,738,507 A | | 4/1988 | Palmquist | 350/96.21 |
| 4,919,509 A | * | 4/1990 | Miller et al. | 350/96.21 |
| 5,136,681 A | * | 8/1992 | Takahashi | 385/40 |
| 5,212,752 A | * | 5/1993 | Stephenson et al. | 385/78 |
| 5,384,885 A | * | 1/1995 | Diner | 385/140 |
| 5,390,269 A | * | 2/1995 | Palecek | 385/78 |
| 5,481,634 A | | 1/1996 | Anderson et al. | 385/76 |
| 6,155,146 A | * | 12/2000 | Andrews et al. | 81/461 |
| 6,254,278 B1 | * | 7/2001 | Andrews et al. | 385/53 |

* cited by examiner

Primary Examiner—Hemang Sanghavi
Assistant Examiner—Sung Pak
(74) Attorney, Agent, or Firm—Thomas, Kayden, Horstemeyer & Risley, LLP

(57) ABSTRACT

A tuning index tool for use in determining the degree of tuning necessary for a tunable optical fiber connector has a first stationary member having a connector adapter affixed thereto and a second movable member within the first member and spring loaded with respect thereto. The second member has a connector adapter affixed thereto axially aligned with the adapter in the first member. The movable member is incrementally rotatable with respect to the stationary member by being pulled against the spring force to disengage the ferrules of connectors in the adapters, which are aligned in a split sleeve. Rotation changes the orientation of the eccentricity vectors of the two connectors, and hence the insertion loss. Measurements of insertion loss are made, and the orientation of the connectors for minimum loss is noted. The number of incremental rotations of the tool indicates the incremental rotation of the ferrule of the connector under test, the eccentricity vector orientation of the other connector being known, that is necessary to achieve minimum insertion loss for the connector with connectors have a known eccentricity vector orientation.

26 Claims, 11 Drawing Sheets

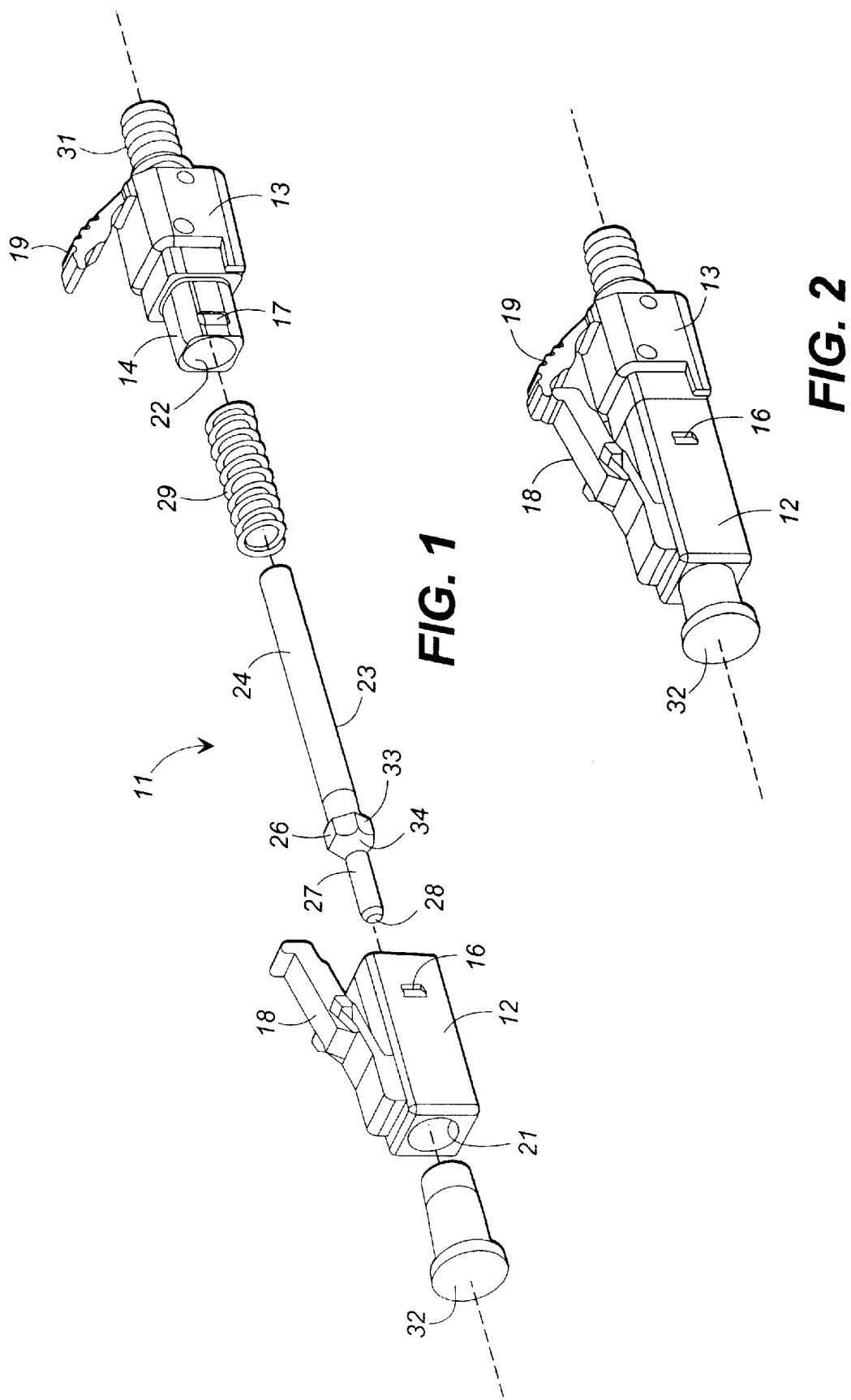

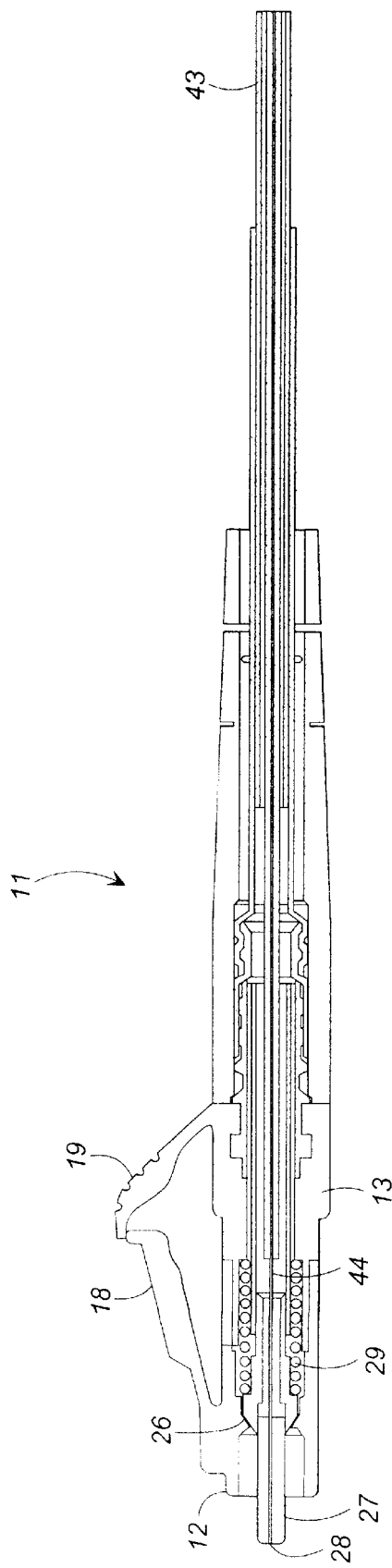
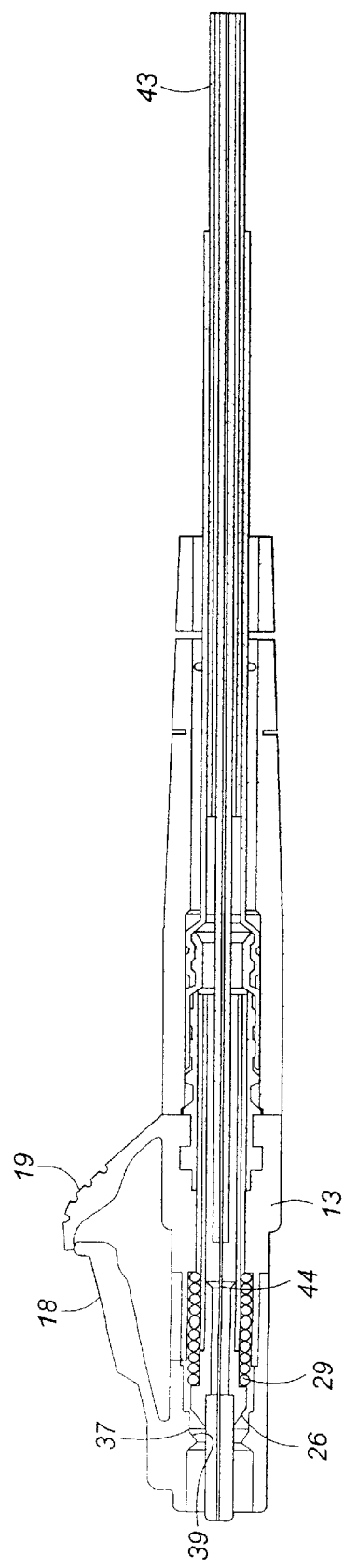
FIG. 5a
FIG. 5b

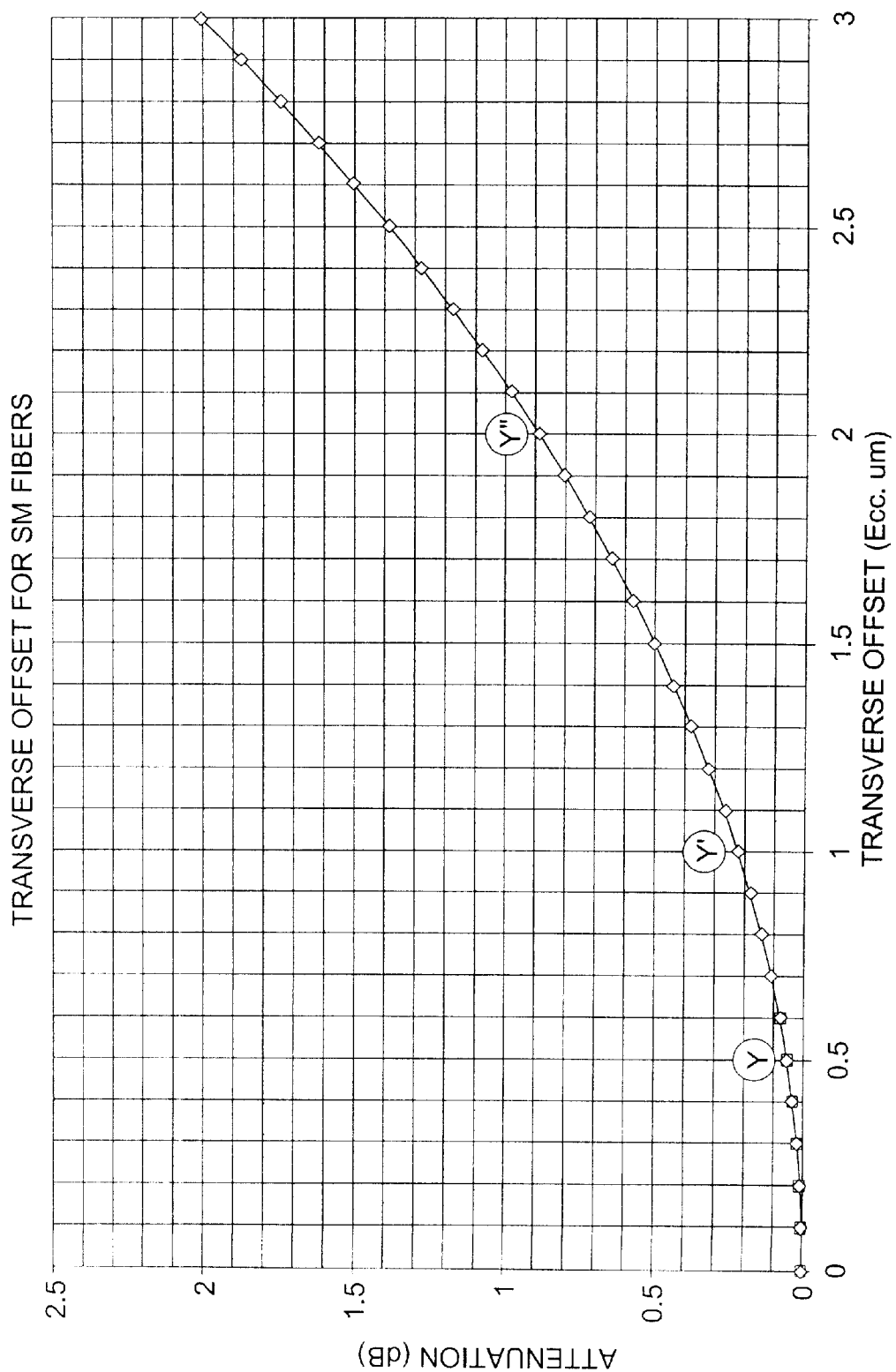

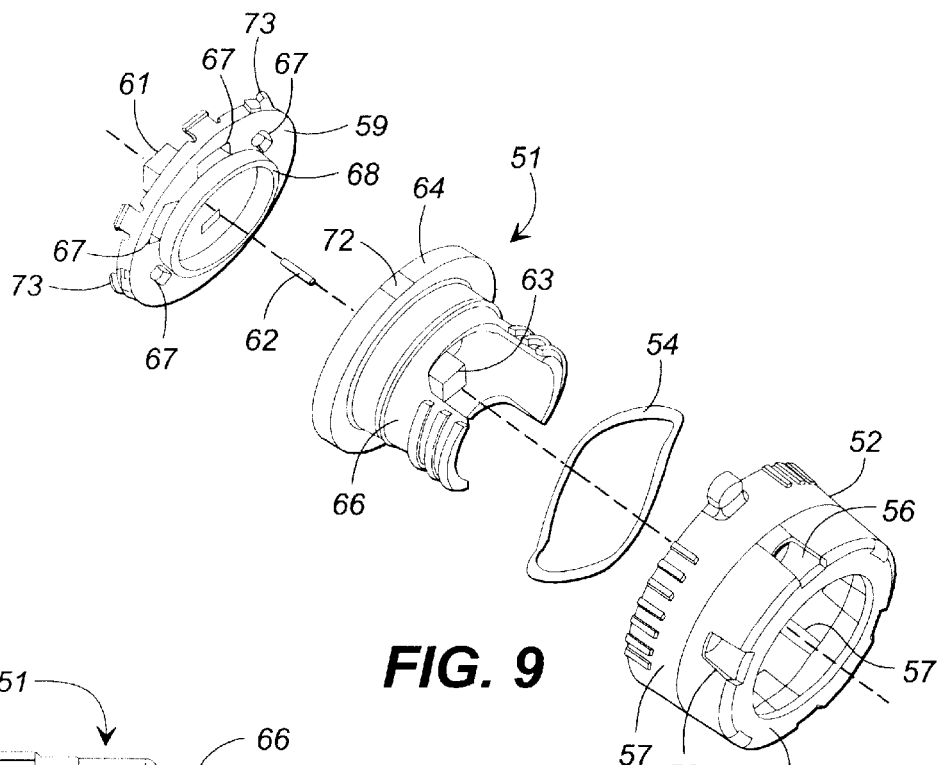
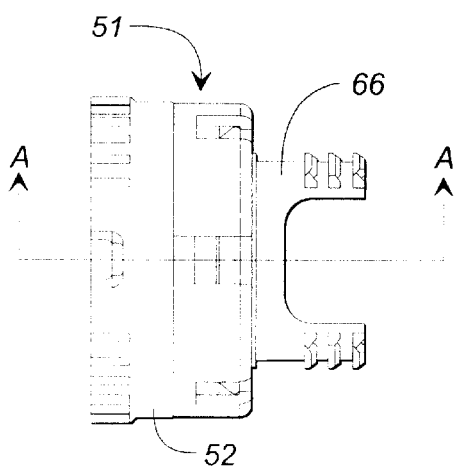
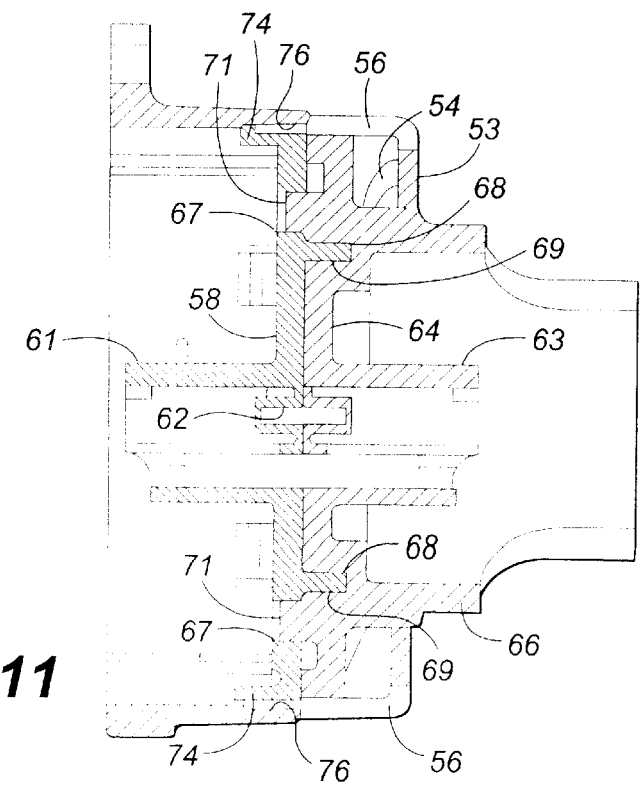
FIG. 9
FIG. 10
FIG. 11

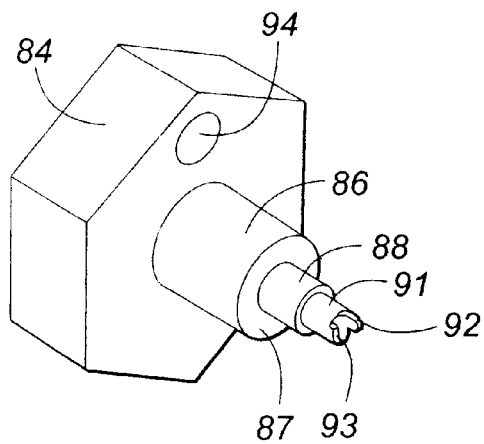
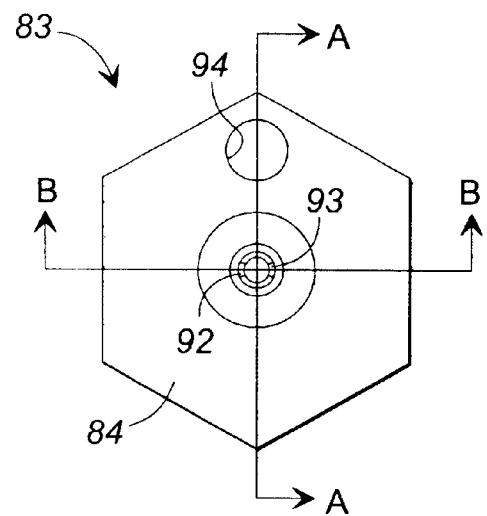
FIG. 14a     FIG. 14b
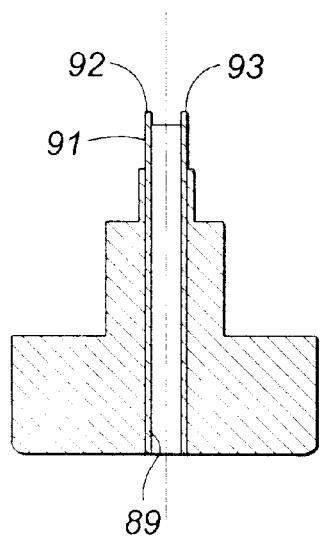
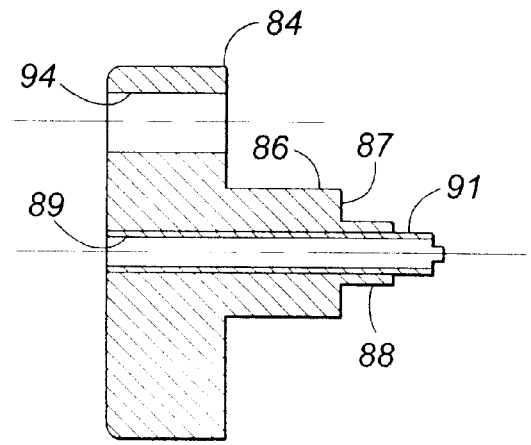
FIG. 14c     FIG. 14d

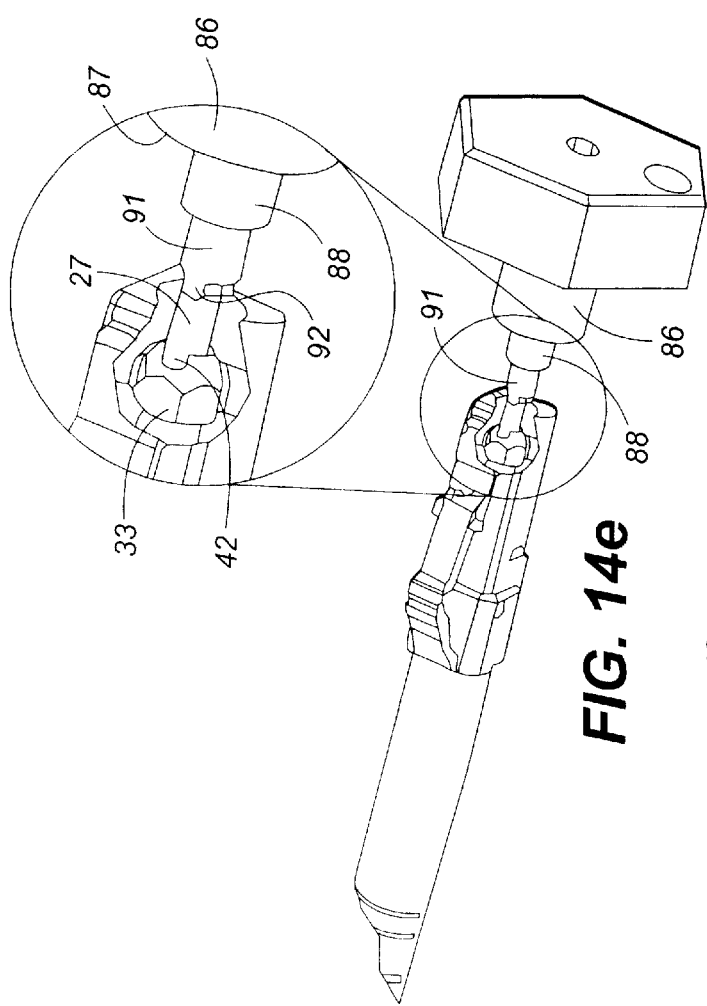
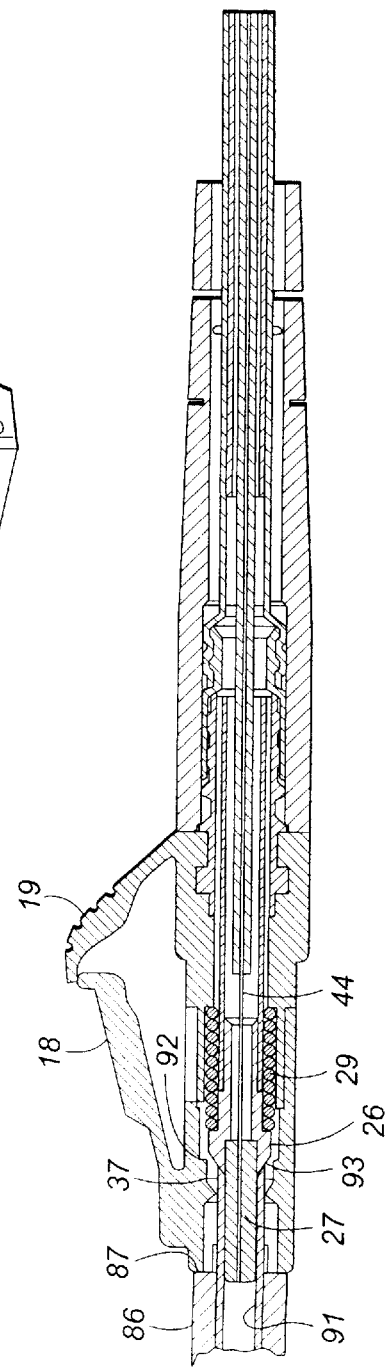
FIG. 14e
FIG. 14f

OPTICAL FIBER CONNECTOR TUNING INDEX TOOL

RELATED APPLICATIONS

This application is related to U.S. patent application Ser. No. 09/363,906 and Ser. No. 09/362,203, both filed concurrently herewith.

FIELD OF THE INVENTION

This invention relates to an optical fiber connector indexable tuning tool and, more particularly to a tool for testing an calibrating tunable optical fiber connector and apparatus for tuning it.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other. Another goal is to minimize back reflections. Such alignment is extremely difficult to achieve, which is understandable when it is recognized that the mode field diameter of, for example, a single mode fiber is approximately nine (9) microns (0.009 mm). Good alignment (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects.

In the present day state of the art, there are numerous, different, connector designs in use for achieving low insertion loss and stability. In most of these designs, a pair of ferrules (one in each connector), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment, some misalignment being acceptable.

Alignment variations between a pair of connectors are the result of the offset of the fiber core centerline from the ferrule centerline. This offset, which generally varies from connector to connector, is known as "eccentricity", and is defined as the distance between the longitudinal centroidal axis of the ferrule at the end face thereof and the centroidal axis of the optical fiber core held within the ferrule passage and is made up of three vectors. It is often the case, generally, that the ferrule passage is not concentric with the outer cylindrical surface of the ferrule (vector I), which is the reference surface. Also, the optical fiber may not be centered within the ferrule passage (vector II whose magnitude is the diametrical difference divided by two) and, also, the fiber core may not be concentric with the outer surface of the fiber (vector III). Hence eccentricity can be the result of any one or all of the foregoing. The resultant eccentricity vector has two components, magnitude and direction. Where two connectors are interconnected, rotation of one of them will, where eccentricity is present, change the relative position of the fibers, with a consequent increase or decrease in the insertion loss of the connections. Where the magnitude of the eccentricities are approximately equal the direction component is governing, and relative rotation of the connectors until alignment is achieved will produce maximum coupling.

There are numerous arrangements in the prior art for "tuning" a connector, generally by rotation of its ferrule, to achieve an optimum direction of its eccentricity. One such arrangement is shown in U.S. Pat. No. 5,481,634 of Anderson et al., wherein the ferrule is held within a base member which maybe rotated to any of four rotational or eccentricity angular positions. In U.S. Pat. No. 4,738,507 of Palmquist there is shown a different arrangement and method for positioning two connectors relative to each other for minimum insertion loss or maximum coupling. The arrangements of these patents are examples of the efforts to achieve optimum reliable coupling, there being numerous other arrangements and methods.

In all such arrangements for achieving optimum coupling with connectors having different magnitudes and directions of eccentricities, the tuning takes place, usually, if not always prior to the final assembly of the connector. As a consequence, an installer in the field has no control over the degree of coupling, other than by trial and error. Further, tuning of the connector cannot be performed after production of the connector is completed. Thus tuning prior to final assembly of the conductor is a step in the production process.

An optical fiber connector that can be tuned for optimum performance after the connector has been assembled would greatly decrease production costs and further, impart a greater measure of reliability to the connectors. Such a connector would be of significant commercial value.

SUMMARY OF THE INVENTION

The present invention is a tuning index tool for use in tuning tunable optical fiber connections for achieving maximum possible signal transmissivity or minimum insertion loss despite the connector being fully assembled. In a preferred embodiment of the invention the principles thereof are illustrated with a connector of the LC type for single mode fibers. It is to be understood that the principles of the invention are applicable to numerous other types of connectors such as, for example, the SC, FC and ST type connectors, as well as to other fiber optic type devices.

A connector for which the present invention is used is, for purposes of illustration, is a modified LC type connector, as shown in U.S. patent application Ser. No. 09/363,906. The basic components of such a connector as shown in that patent application comprise a ferrule-barrel assembly for holding the end of an optical fiber extending axially therethrough and a plug housing member which contains the barrel-ferrule assembly. A coil spring member contained within the housing surrounds the barrel and bears against an interior wall of the housing and an enlarged barrel member, thereby supplying forward bias to the barrel-ferrule assembly relative to the housing. The barrel member, referred to as a flange in the Anderson et al. patent, is shaped to be supported within an interior cavity within the housing in any one of four rotational orientations with respect to the central axis of the fiber holding structure. A ferrule extends axially from the enlarged barrel member and contains a fiber end therein. Thus the direction of eccentricity of the fiber relative to the central axis can have any one of four rotational or angular orientations. The connector is "tuned" to the extent that four orientations are possible. However, the "tuning" is a manufacturing step preceding final assembly of the connector, after which it is no longer "tunable".

The ferrule-barrel assembly of the connector is modified so that the enlarged barrel member or flange is optimally hexagonal in shape, and has a tapered or chamfered leading surface which may be slotted. The housing is also modified so that the interior cavity is hexagonal in shape to accommodate the barrel member in any of six rotational orientations and a sloped constriction against which the leading surface bears in its forward position. Tuning of the fully assembled connector is accomplished by the application of an axial force to the barrel member, as by a spanner wrench fitted within the slots in the leading surface, sufficient to overcome the bias of the coil spring and to push the barrel portion rearwardly out of engagement with the hexagonally shaped recess in the housing and the sloped constriction. The ferrule-barrel assembly is then incrementably rotatable to any of six angular orientations, sixty degrees (60°) apart. It should be noted that a lesser number of surfaces can be used if the diagonal distance of the barrel cross-section is reduced sufficiently to allow rotation thereof within the plug housing or, alternatively if the housing bore is enlarged, which, however, weakens the walls of the housing. Fewer surfaces means larger increments of rotation and hence less precise reduction in loss. Also, more than six surfaces may be used, however, the improvement over six surfaces is slight and the clearance surrounding the barrel makes limiting rotation within the housing difficult to achieve.

In accordance with the invention, an indexable tuning tool having a spring loaded split LC adapter that is keyed and labeled to measure the optical performance of an LC connector at six different angular orientations. The tool has a longitudinal split ceramic sleeve therein for aligning two LC connector end faces. In operation, a test jumper cable having an LC connector which has an eccentricity of a magnitude greater than that of the connector to be tuned and a known direction (angular orientation), is inserted into the sleeve and the production jumper connector is fitted into the sleeve so that the connector ferrule ends abut. The opposite end of the jumper cable is connected to an optical source, or an optical detector, and the production jumper is connected to a source or detector to complete a test circuit. Ideally, the test jumper has an eccentricity of 1.8 to 3.5 $\mu$m relative to the ferrule axis, and has an angular orientation of zero degrees (0°) or one hundred eighty degrees (180°), preferably the former which is an upright vertical orientation. Insertion loss measurements are then taken and the initial loss is noted. The portion of the tool holding the product jumper is spring loaded to allow separation of the fiber end faces and rotation thereof. The tool is thus rotated in sixty degree (60°) increments, with measured insertion loss being recorded at each increment. The angular orientation of the product jumper that yields minimum insertion loss is thus determined. The labeling on the tool indicates how many degrees, in sixty degree increments, the product jumper had to be rotated to produce minimum insertion loss. Inasmuch as the angular orientation of the connector of the test jumper is known, preferably, as stated hereinbefore, zero degrees (0°) or straight up or vertical, the tool indicates how many incremental stages the product jumper requires to have a corresponding vertical orientation. It is also feasible to ascertain, instead of minimum insertion loss, the angular orientation for maximum insertion loss. Rotation of 180° from this orientation yields the orientation for minimum insertion loss. In both methods, one or the other of the extremes of insertion loss is determined.

A tool, used for tuning, in the form of a spanner wrench is included as an element of the tuning test operation. The tuning tool wrench comprises an enlarged handle shaped, such as hexagonally, for gripping from which extends a hollow sleeve having a distal end with first and second tangs extending therefrom. The sleeve is adapted and sized to fit over the ferrule of the product jumper connector with the tangs engaging the slots in the leading or front surface of the barrel member. In use, the tangs are engaged and the ferrule-barrel assembly is pushed to the rear out of engagement with the plug housing and against the spring bias, so that the ferrule-barrel assembly may be rotated the required number of degrees as indicated by the index tool to the angular orientation yielding minimum insertion loss where the connector is mated with another connector having vertical orientation of its eccentricity. The spanner wrench of the invention has a shoulder from which the sleeve extends, which butts against the housing to limit the insertion distance of the wrench. The distance from the face of the shoulder to the tangs is chosen such that the ferrule-barrel assembly, when pushed against the coil spring, does not cause the spring to bottom, which can be damaging to the spring. The barrel is then rotated to the tuned position. When the wrench is removed, the spring returns the barrel forward to its new rotated position. In this manner, the product connector is tuned. It is contemplated that all mating connections will have such a vertical orientation, hence the installer, for example, does not have to be concerned with optimum tuning.

Thus the unique structure of the connector permits tuning of the assembled connector. Further, the tuning tool enables additional rotations of the ferrule-barrel assembly when desired, for whatever reason, such as where it is desired to have operation at a predetermined value of loss, as when channel balance among several channels is desired.

DESCRIPTION OF THE DRAWINGS

FIG. 1 is an exploded perspective view of the components of the connector;

FIG. 2 is a perspective view of the assembled connector;

FIG. 4b is a front elevation view of the member of FIG. 4a;

FIG. 4c is a side elevation view of a modification of the ferrule-barrel assembly of FIG. 1 or FIG. 4a;

FIG. 5a is a side elevation cross-sectional view of the connector;

FIG. 5b is a side elevation cross-sectional view of the connector in its tuning configuration;

FIG. 6 is a graph of the effect of offset between two fiber ends;

FIG. 9 is an exploded perspective view of a tuning index tool;

FIG. 10 is a side view of the test tool of FIG. 9 as assembled;

FIG. 11 is a cross-sectional view of the tool along the lines A—A of FIG. 10;

FIG. 14a is a perspective view of the tuning wrench of the invention for tuning a connector;

FIG. 14b is a front elevation view of the wrench of FIG. 14a;

FIG. 14c is a cross-sectional view of the wrench of FIG. 14b along the line B—B;

FIG. 14d is a cross-sectional view of the wrench of FIG. 14b along the line A—A;

FIG. 14e is a detail of the tuning operation using the wrench of FIG. 14b; and

FIG. 14f is a cross-sectional view of the connector of the invention as it is being tuned by the wrench.

DETAILED DESCRIPTION

Figure 3A:
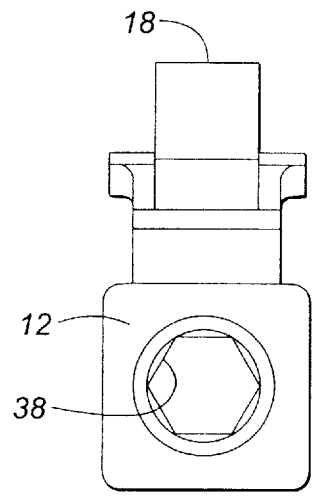
FIG. 3a is a front elevation view of the connector housing, front portion.

FIG. 1 is an exploded perspective view of the principal components of an LC type connector 11 which embodies the principles of the present invention. It is to be understood that these principles are also applicable to other types of connectors, such as an ST, SC, or other amenable to modification to incorporate these principles. Connector 11 comprises a plug housing formed of a front section 12 and a rear section 13 having an extended portion 14 which fits into section 12 and latches thereto by means of slots 16—16 in front section 12 and latching members 17—17. Members 12 and 13 are preferably made of a suitable plastic material. Member or front section 12 has a resilient latching arm 18 extending therefrom for latching the connector 11 in place is a receptacle or adapter. Member or section 13 has extending therefrom a resilient latch arm or trigger guard 19, the distal end of which, when the two sections 12 and 13 are assembled, overlies the distal end of arm 18 to protect it from snagging and to prevent nearby cables from becoming entangled. Usually latch arm 18 and guard 19 are molded with their respective housing sections 12 and 13, respectively, and form "living hinges" therewith, which enable them to be moved up and down between latching and unlatching positions. Front section 12 has a bore 21 extending therethrough which, when the parts are assembled, is coextensive with a bore 22 extending through rear section 13. The bores 21 and 22 accommodate a ferrule-barrel assembly 23 which comprises a hollow tubular member 24 having an enlarged flange or barrel member 26 from which extends a ferrule 27 which may be made of a suitably hard material such as, preferably, ceramic, glass, or metal. Ferrule 27 has a bore 28 extending therethrough for receiving and holding an optical fiber therein. When the connector 11 is assembled, a coil spring 29 surrounds the tubular portion 24 of the assembly 23, with one end bearing against the rear surface of flange 26 and the other end bearing against an interior shoulder in rear section 13, as will best be seen in subsequent figures.

In practice, the uncoated portion of the optical fiber is inserted into bore 28 of ferrule 27 and adhesively attached thereto. Spring 29 is compressed as the sections 12 and 13 are connected and supplies a forward bias against the rear of flange 26 and, hence, to ferrule 27. This arrangement of ferrule 27 and spring 29 is considered to be a "floating" design. Prior to connection, the spring 29 causes ferrule 27 to overtravel its ultimate connected position. When connector 11 is connected within a suitable adapter and the distal end of ferrule 27 butts against the corresponding ferrule end of another connector or of other apparatus, spring 29 will be compressed, thereby allowing backward movement of ferrule 27 to where its end, and the end of the abutting ferrule, lie in the optical plane (transverse centerline) between the two connectors.

The rear end of rear section 13 has a ridged member 31 extending therefrom for attachment of optical fiber cable and a strain relief boot, not shown. For protection of the distal end of ferrule 27 during handling and shipping, a protective plug 32, sized to fit within bore 21, is provided. FIG. 2 depicts the assembled connector 11 in its shipping or handling configuration.

Figure 3B:
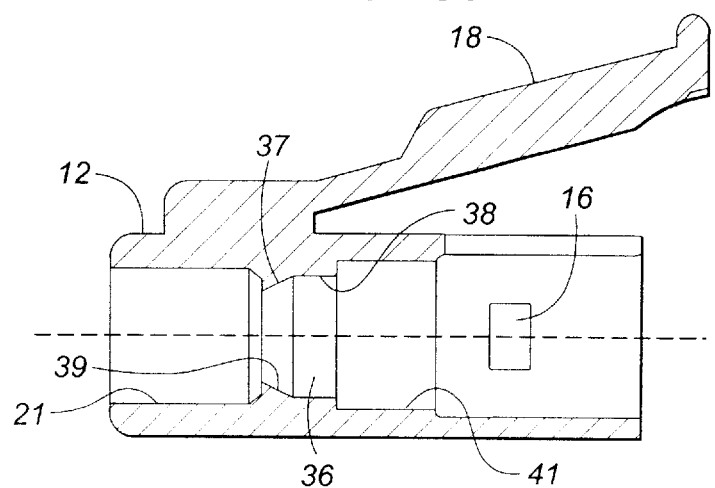
FIG. 3b is a cross-sectional side elevation view of the front portion.
Figure 3C:
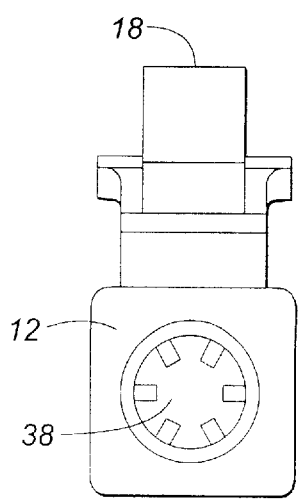
FIG. 3c is a front elevation view of the connector housing first portion, adapted to receive the ferrule-barrel assembly of FIGS. 4c and 4d.
Figure 4A:
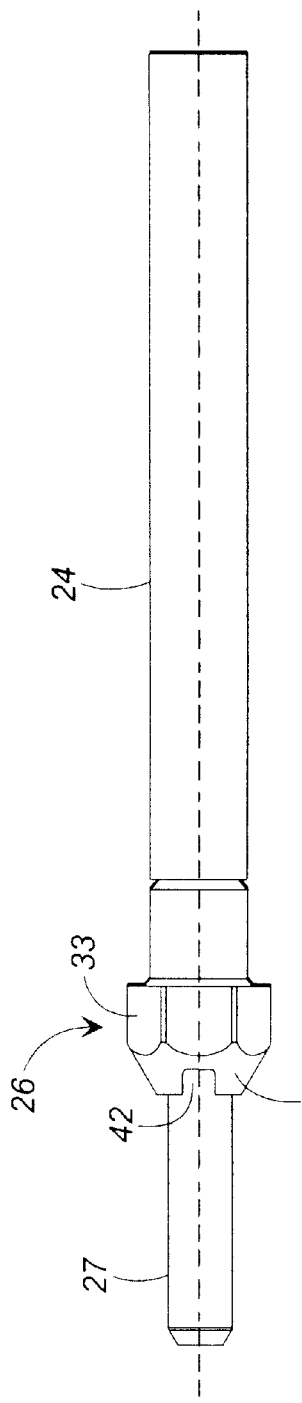
FIG. 4a is a side view of a modified ferrule-barrel member of the connector.
Figure 4B:
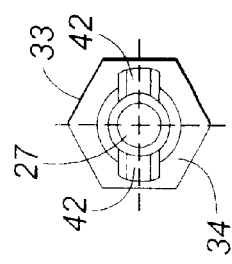
Figure 4C:
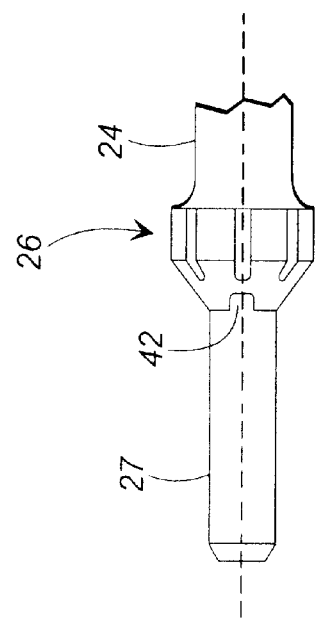
Figure 4D:
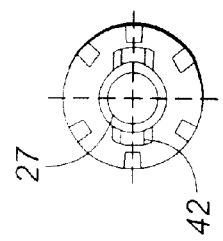
FIG. 4d is a front elevation view of the assembly of FIG. 4c.

As best seen in FIGS. 4a and 4b, flange 26 has a hexagonally shaped portion 33 and a front tapered portion 34, which can be a tapered extension of the hexagon shape. While the following discussion relates to a multi-faceted ferrule holding member, it is to be understood that the term "faceted" is intended to include other locating arrangements such as, for example, sots or splines. Front section 12 has a flange seating opening 36 formed in a transverse wall 37 thereof which has a hexagonally shaped portion 38 and a tapered portion 39 dimensioned to receive and seat flange 26, as best seen in FIGS. 3a and 3b. In FIG. 3c, the opening 36 has, instead of a hexagonal shape, a plurality of splines 40 extending inwardly therefrom, a modification especially adapted to receive the ferrule-barrel assembly of FIGS. 4c and 4d. That portion 41 of bore 21 immediately to the rear of portion 38 has a diameter sufficient to allow rotation of flange 26 when it is pushed to the rear and disengaged from the seat 36. Thus, as will be discussed more filly hereinafter, when flange 26 is pushed to the rear (against the force of spring 29) it may be rotated and, when released, re-seated with tapered portion 34 acting as a guide. The hexagonal configuration makes it possible to seat the flange 26 in any of six angular rotational positions, each sixty degrees (60°) apart. It has been found that a flange having fewer than six sides cannot be rotated in the assembled connector unless the diameter of bore portion 41 is increased because the diagonal of a four sided flange is too great for rotation of the flange. However, increasing the diameter of portion 41 seriously weakens the walls of the housing section 12. Further, in the tuning of the connector it has been found that six sides gives a more accurate tuning for reduction of insertion loss. The use of a flange with more than six sides is possible, and gives an even greater tuning accuracy by creating smaller increments of rotation. However, the increased accuracy is not sufficiently great to justify the increased difficulty in achieving a stable and firm seating of the flange. As the number of flange sides is increased, the periphery thereof approaches a circular configuration, which would not be seated firmly and which possibly would be rotatable even when seated. As a consequence, it has been found that a six sided flange is optimum.

FIGS. 4a and 4b show a modification of a barrel-ferrule assembly 23 in which the sloped or tapered portion 34 has a notch 42 therein for accommodating a tuning tool, not shown.

FIGS. 5a and 5b depict, in cross-section, the connector 11 of the present invention showing, in FIG. 5a, the flange seated position and in FIG. 5b, the disengaged and rotatable position of the flange for tuning, demonstrating how tuning is achievable with a fully assembled connector. It should be noted that the thickness of the wall 37 is slightly less than that of flange 26, thereby insuring that flange 26 can be disengaged (pushed back) from the seat 36 to where it can be rotated without causing spring 29 to bottom. Connector 11 is shown mounted on the end of a cable 43 containing a fiber 44, which extend through connector 11 as shown.

FIG. 6 is a graph of the effect of offset between two fiber ends (two connectors) which is "transverse offset" versus attenuation. For very small offsets, such as 0.5 microns (point Y), the loss is corresponding small, about 0.05 dB. In the range from zero offset to one micron (POINT Y'), the loss remains well below 0.3 dB, which is a preferred limit on loss. The next increment range of offset, from one micron to two microns (point Y") shows an exponential increase in loss, from about 0.22 dB to 0.9 dB. Thus, it can be seen that for each incremental increase of one micron offset, the loss increases exponentially. It can be appreciated therefore, that tunability of the connector to decrease the offset between the two fiber ends is highly desirable.

Figure 7:
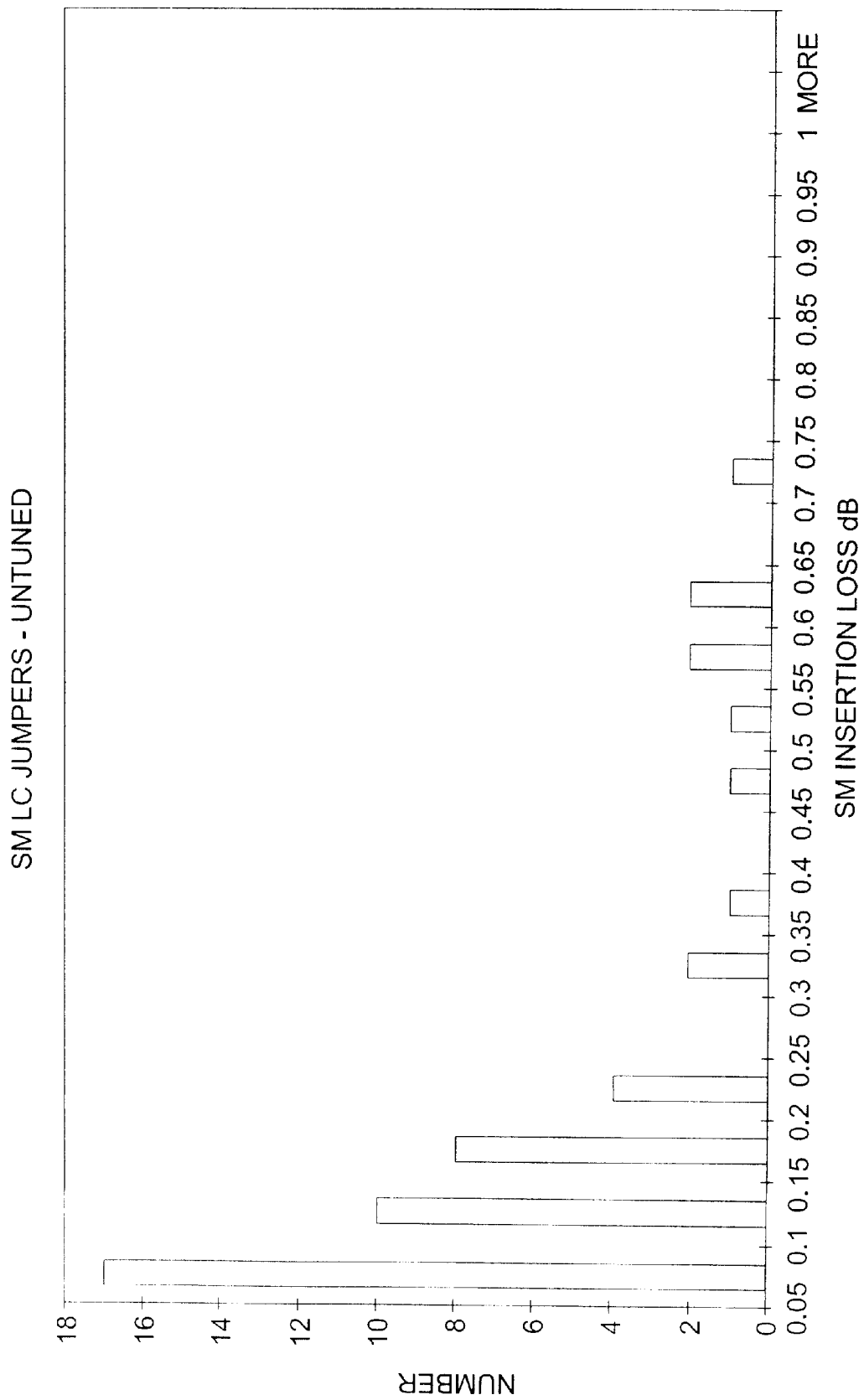
FIG. 7 is a bar chart of the distribution of insertion loss for untuned connectors.
Figure 8:
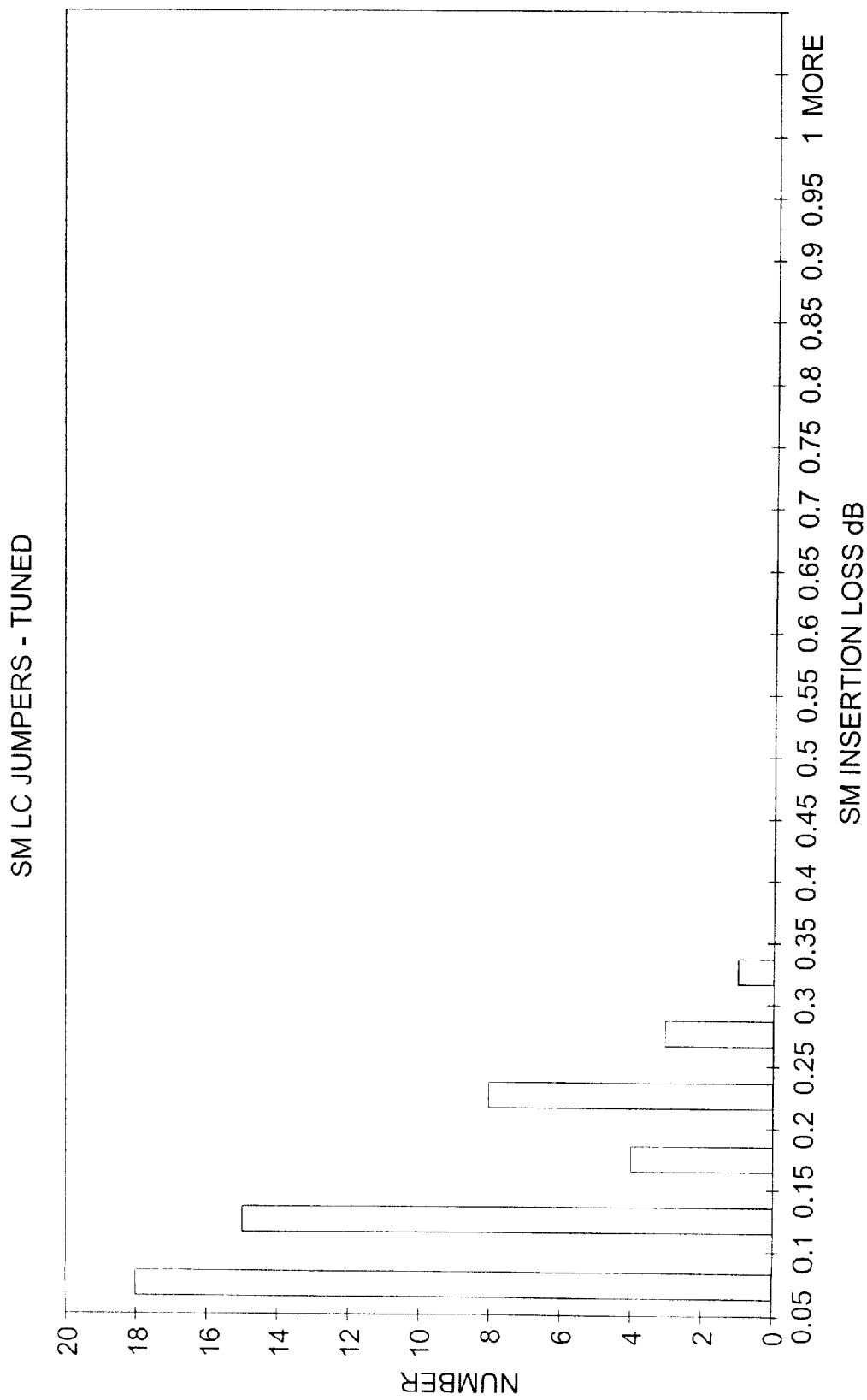
FIG. 8 is a bar chart of the distribution of insertion loss for tuned connectors.

FIG. 7 is a bar chart of the measurements on a group of untuned connectors showing a wide distribution of insertion loss. It can be seen that several of the connectors exceed the preferred insertion loss limit of 0.3 dB. FIG. 8 is a bar chart of the same group of connectors after tuning, showing a compression of the loss distribution to where only one connector exceeds the 0.3 dB limit. Thus, from FIGS. 7 and 8, it can be seen that tuning materially enhances the performance of connectors where there are eccentricities present, which is virtually always the case.

Tuning Index Tool

FIG. 9 is an exploded perspective view of the tuning index tool 51 of the invention discussed hereinbefore. Tool 51 comprises housing comprising a hollow circular member 52, preferably of a plastic material, having a retaining wall 53 for a warped leaf spring 54. Member 52 has a plurality of openings or windows 56 around the periphery thereof, spaced sixty degrees (60°) apart, and a plurality of keyways 57, only one of which is shown in FIG. 9, which are spaced around the inner periphery of member 52 and spaced preferably one hundred twenty degrees (120°) apart. With reference to FIG. 11, which is a cross-section of tool 51 along the lines A—A of FIG. 10, member 52 has a wall 58 therein, formed by disc member 59 which has a connector adapter 61 affixed thereto on one side. Extending from the other side of disc 59 is a split sleeve 62, preferably of a ceramic material, held within adapter 61, for receiving the ferrule of a connector mounted in adapter 61. Sleeve 62 also receives the ferrule of a connector mounted in a second adapter 63 which is affixed to a wall 64 of a movable member 66. Disc member 59 has a circular array of locating holes 67 surrounding a locating ring 68 which seats in a circular groove 69 wall 64 of member 66. As best seen in FIG. 11, wall 64 has extending therefrom six locating projections 71 which are dimensioned to fit within openings or locating holes 67. Holes 67 form a circular array, with the holes spaced sixty degrees (60°) apart, and, importantly, with one of the holes being at zero degrees (0°) relative to the vertical axis of adapter 61. On the other hand, locating projections or pins 71 are in a circular array and spaced sixty degrees (60°) apart, with one projection or pin 71 being at zero degrees (0°) relative to the vertical axis of adapter 63. The outer edge of wall 64 preferably has a locating mark 72 thereon which, as will be apparent hereinafter, is visible through the windows 56 as member 66 is rotated during tests. Preferably locating mark 72 is aligned with the vertical axis of adapter 63 and is, as a consequence, an indicator of the zero degree (0°) location of adapter 63. It should be obvious that six pins 71 are not absolutely necessary, since the locating feature can be accomplished with as few as one pin.

Figure 12:
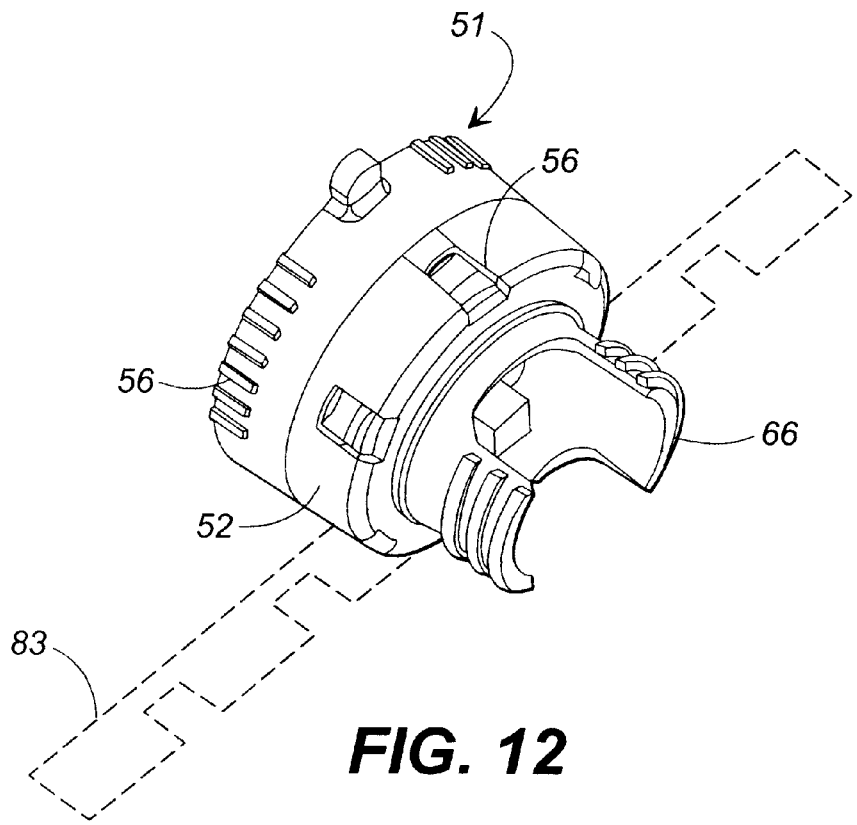
FIG. 12 is a perspective view of the assembled tool.

Tool 51 is assembled by spring 54 being placed within member 52 to bear against retaining wall 53, as seen in FIG. 11. Movable member 66 is then inserted into member 52 so that wall 64 rests against spring 54. Disc member 59, the periphery of which has projecting key 73, is then inserted into member 52 with the key being inserted into keyways 57, and latched therewithin by a plurality of peripherally disposed latching members 74 on member 59 and latching slots 76 within member 52. Sleeve 62 is fitted within the two adapter sleeves, as shown in FIG. 11. The assembled tool 51 is shown in FIGS. 10 and 12, and the tool in use is shown in FIG. 13.

Figure 13:
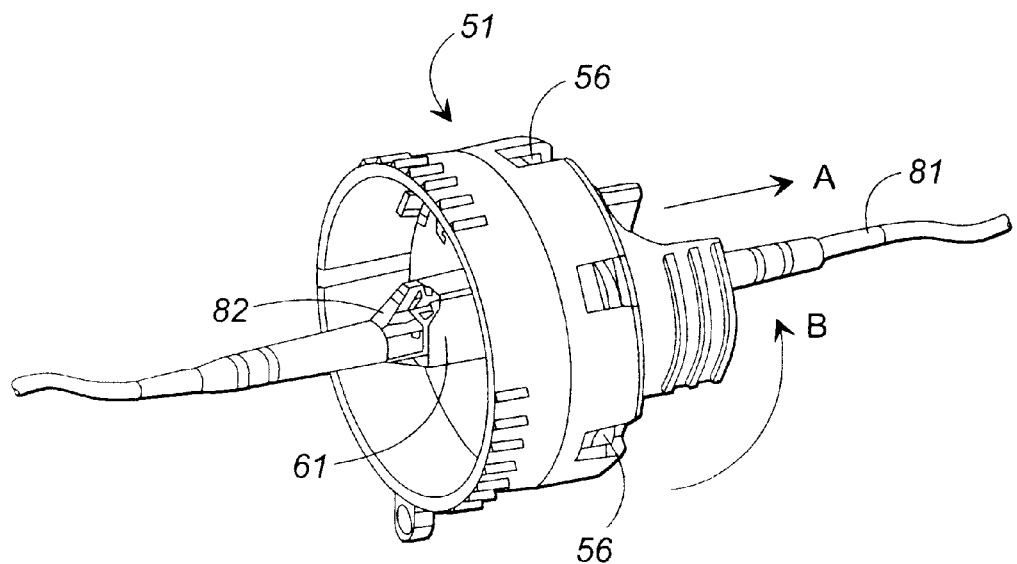
FIG. 13 is a perspective view of the tuning index tool of FIG. 10 as used in performing tuning tests.

In use, as best seen in FIG. 13, a test jumper 81 which terminates in an LC connector, not shown, is inserted into adapter 63. The connector has a known magnitude of offset or eccentricity greater than the connector 82 to be tested for tuning oriented vertically (0°). The orientation can be 180°, which is also vertical, but the following discussion will be directed toward the 0° orientation. Preferably the magnitude of the eccentricity relative to the ferrule axis is 1.8 to 3.5 microns. The connector 82 to be tuned is inserted into adapter 61 and has a unknown amplitude and direction of eccentricity. With marker 72 showing in one of the windows, such as, for example, the 0° orientation window, which may be indicated by a marking strip 83 affixed on the periphery of member 52 (see FIG. 12), insertion loss is measured. The operator then pulls member 66, which is ridged to give purchase, in the direction indicated by arrow A, against spring 54 until the ferrules of the two connectors are disengaged and locating pins 71 are cleared from openings 67. The member 66 is then rotated, for example, clockwise direction B), until the marker 72 appears in the next window 56, in other words, member 66 is rotated 60°, as is connector 63. Insertion loss is again measured and recorded. The process is repeated for five more incremental rotations, and the measured insertion losses will have a maximum and a minimum. It is noted at which incremental position the insertion loss was the least, for example, it was least at the second rotational position, which is an indication that 120° of rotation resulted in closest alignment of the fiber ends. The connector to be tuned is then removed from the tool. Suitable means, such as the especially designed spanner wrench previously discussed, is then used to rotate the ferrule of the connector 120° counter-clockwise in the manner explained hereinbefore, to "tune" the connector. Inasmuch as the eccentricity vector of the test jumper was vertical (0°) during the test, then the eccentricity vector of the product connector is now also vertical, and the connector junction with the other "tuned", or vertically oriented eccentricity, connecting member, will exhibit the minimum achievable insertion loss for that connection. The foregoing process may be practiced to determine a degree of loss between the extremes for use in channel balancing.

Tuning Wrench

As pointed out hereinbefore, after the insertion loss measurements are completed and the eccentricity orientation of the connector determined, the product connector must then be tuned to the indicated orientation. The tuning of the connector is discussed in connection with FIGS. 5a and 5b wherein it is shown that the ferrule 27 is pushed into the connector against the force of spring 29 until the flange 26 clears the flange seating opening 36 sufficiently to allow the ferrule/barrel assembly to be rotated. This movement of the ferrule may be accomplished by any suitable means, such as, for example, needle nose pliers which are used to grip the ferrule and to push it. The ferrule is made of sufficiently hard material, such as a ceramic, that judicious gripping thereof with pliers is generally insufficient to damage the ferrule. It is desirable that the ferrule-barrel assembly not be pushed so far that the spring 29 bottoms, which can, over time, weaken the spring or even damage it.

In FIGS. 14a through 14f there are shown several views of a unique tuning wrench 83 for use with the ferrule-barrel arrangement of FIG. 4a. Wrench 83 has a first, enlarged, body portion 84 having a hexagonal shape for ease of gripping. It is to be understood that portion 84 can have other shapes besides hexagonal; however, the hexagonal shape makes possible an easy determination of when a 60° rotation has been achieved. Extending from portion 84 is a limiting member 86 having a diameter greater than bore 21 in the front portion of connector 11 and a flat face 87 at its distal end. Extending from face 87 is a strengthening member 88 which has a diameter that is less than the bore 21. A central bore 89 extends through member 84, 86, and 87 as shown. A tubular member 91 is located in bore 89 and affixed thereto. Member 91 is preferably made of metal, although it is not intended that it be restricted thereto, since other materials may be suitable. The distal end of member 91 has first and second tangs 92 and 93, diametrically opposite each other which form a spanner wrench. The inner diameter of member 91 is such that it slides easily over the ferrule 27 of the connector 11, and tool 83 may then be pushed forward to where the tangs 92 and 93 engage slot 42 of the flange member 26. It will be obvious to workers in the art that one tang can be used. FIG. 14e depicts this operation just prior to such engagement, and FIG. 14f depicts ferrule 27 in the disengaged position after tool 83 is pushed forward until face 87 butts against the front of the connector, thereby limiting the distance that the ferrule/barrel assembly is pushed against the spring. The distance that member 91 protrudes from limiting member 86 is sufficient to allow tangs 92 and 93 to engage slot 42, plus a distance after such engagement to incur disengagement of flange member 26, as seen in FIG. 14f, but no more, face 87 blocking any further rearward movement thereof. Body portion 84 preferably has a reference hole 94, located at one of the cusps of the hexagonal shape, and, as seen in FIG. 14b, the plane in which the tangs 92 and 93 lie is normal to the vertical centerline of reference hole 94.

The wrench 83 is primarily intended for use with the tuning index tool 51 and is used to make the incremental rotations of the product connector, the number of increments being indicated by the results of the test process discussed hereinbefore. However, the wrench may also be used to make tuning adjustments in the field to the fully assembled product connector.

The tuning wrench, as hereindescribed, is the subject of U.S. patent application Ser. No. 09/362,203 filed concurrently herewith.

In conclusion of the detailed description, it should be noted that it will be obvious to those skilled in the art that many variations and modifications may be made to the preferred embodiment as shown herein without substantial departure from the principles of the present invention. All such variations and modifications are intended to be included herein as being within the scope of the present invention as set forth in the claims. Further, in the claims hereafter, the corresponding structures, materials, acts, and equivalents of all means or step plus function elements are intended to include any structure, material, or acts for performing the functions without specifically claimed elements.

What is claimed is:

1. A tuning index tool for use in tuning an assembled optical fiber connector, said test tool comprising:
   a hollow member having a central axis and an open end and a retaining wall at the end thereof opposite said open end, said retaining wall having an opening therein;
   said hollow member having an interior wall spaced from said retaining wall and having a first connector adapter thereon protruding toward said open end, said adapter having a first connector ferrule receiving member axially disposed therein;
   a movable member within said hollow member having an end wall having a second connector adapter protruding therefrom toward said retaining wall, said adapter having a second connector ferrule receiving member axially aligned with said first connector ferrule member; and
   a spring member located between said retaining wall and said end wall for forcing said end wall into contact with said interior wall of said hollow member, said movable member being axially rotatable relative to said hollow member when said end wall and said interior wall are out of contact.

2. A tuning index tool as claimed in claim 1 wherein a split sleeve member adapted to receive the ferrules of connectors located in said first and second adapters is inserted in said first and second adapter connector ferrule receiving members.

3. The tuning index tool as claimed in claim 1, further comprising a means for indicating the angular orientation of said movable member to said hollow member.

4. A tuning index tool as claimed in claim 1 wherein said hollow member has a circular wall having a plurality of windows spaced around said circular wall.

5. A tuning index tool as claimed in claim 4 wherein said windows are spaced sixty degrees (60°) apart.

6. A tuning index tool as claimed in claim 5 wherein said end wall of said movable member has a circumferential edge having a locating mark thereon, said locating mark being visible through one of said windows.

7. A tuning index tool as claimed in claim 1 wherein said interior wall comprises a disc member having a circular locating ring extending therefrom concentric with said central axis.

8. A tuning index tool as claimed in claim 7 wherein said end wall of said movable member has a circular axially concentric groove adapted to receive said locating ring.

9. A tuning index tool as claimed in claim 7 wherein said disc member is insertable within said hollow member and has a plurality of latching members adapted to latch to matching slots in said hollow member.

10. A tuning index tool as claimed in claim 7 wherein said hollow member has a circular wall having a plurality of keyways therein, sand said disc member has a plurality of keys adapted to fit within said keyways for locating said disc member within said hollow member.

11. A tuning index tool as claimed in claim 1 wherein said end wall of said movable member has at least one locating member projecting therefrom.

12. A tuning index tool as claimed in claim 11 wherein there is a plurality of locating members projecting from said end wall in a circular array.

13. a tuning index tool as claimed in claim 12 wherein there are six locating members in said circular array, spaced sixty degrees (60°) apart.

14. A tuning index tool as claimed in claim 11 wherein said interior wall of said hollow member has a plurality of locating holes therein arranged in a circular array and adapted to receive said locating member.

15. A tuning index tool as claimed in claim 14 wherein there are six locating holes in said circular array, spaced sixty degrees (60°) apart.

16. The tuning index tool as claimed in claim 14, wherein the circular array of locating holes is adapted to receive said locating member in any of a number of angular orientations.

17. A method of testing for eccentricity orientation a first optical fiber connector having a ferrule extending therefrom comprising:

inserting the connector in a tool having a first adapter for receiving the connector;

inserting a test connector in the tool in a second adapter, said test connector having an eccentricity vector of known direction so that the ferrule ends of the two connectors abut in engagement;

measuring the insertion loss;

disengaging the ferrules and rotating one of the connectors through a first incremental angle;

re-engaging the ferrule ends;

measuring the insertion loss;

continue the steps of disengaging, rotating re-engaging, and measuring until the connector being rotated has rotated through three hundred and sixty (360°) degrees;

noting the angular orientation of the connectors relative to each other at the stage of minimum measured insertion loss.

18. The method as claimed in claim 17 wherein each rotation of the connector is sixty degrees (60°).

19. The method as claimed in claim 17 wherein the connector being rotated is the test connector.

20. A tool for providing selectable insertion loss in optical fiber connections, said tool including:

first apparatus comprising a centrally located optical jack and at least a first indexing member;

second apparatus comprising a centrally located optical jack and a plurality of second indexing members, said first and second apparatuses being shaped to engage each other in a mating relationship; and a spring member adapted to urge the first and second indexing members into engagement with each other in one of a plurality of stable rotational positions in a manner that allows eccentricity of the optical fiber connection to be measured.

21. A tuning index tool comprising:

a hollow member having a retaining wall and an interior wall spaced from said retaining wall, said interior wall having a first connector adapter member;

a movable member having an end wall, said end wall having a second connector adapter; and a spring member located between said retaining wall and said end wall for forcing said end wall into contact with the interior wall, in which said movable member is axially rotatable relative to said hollow member when said end wall and said interior wall are out of contact.

22. A tuning index tool as claimed in claim 21, wherein said movable member has at least one projecting locating member and said hollow member has a circular array of openings for receiving said locating member in any of a number of angular orientations.

23. A tuning tool as claimed in claim 22, wherein there are six openings in said hollow member spaced sixty degrees (60°) apart.

24. A tuning tool as claimed in claim 23, wherein there is a plurality of projecting locating members arranged in a circular array and spaced equidistant from each other.

25. A tuning tool as claimed in claim 24 wherein there are six locating members spaced sixty degrees (60°) apart.

26. A tuning tool as claimed in claim 22, and further including means for indicating the angular orientation of said second member to said housing.

* * * * *